US011897797B2

(12) United States Patent
Pu et al.

(10) Patent No.: US 11,897,797 B2
(45) Date of Patent: Feb. 13, 2024

(54) METHOD FOR REMEDIATING GROUNDWATER ORGANIC CONTAMINATION BY IN-SITU REACTION ZONE

(71) Applicant: CHENGDU UNIVERSITY OF TECHNOLOGY, Sichuan Province (CN)

(72) Inventors: Shengyan Pu, Sichuan Province (CN); Hui Ma, Sichuan Province (CN); Dong Yu, Sichuan Province (CN); Dongyuan Luo, Sichuan Province (CN); Junyan Du, Sichuan Province (CN); Xinxin Ni, Sichuan Province (CN); Zhu Miao, Sichuan Province (CN); Yu Wang, Sichuan Province (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/198,994

(22) Filed: May 18, 2023

(65) Prior Publication Data
US 2023/0373823 A1 Nov. 23, 2023

(30) Foreign Application Priority Data

May 19, 2022 (CN) .......................... 202210560881.7
Aug. 18, 2022 (CN) .......................... 202210996190.1

(51) Int. Cl.
*C02F 1/70* (2023.01)
*C02F 1/72* (2023.01)
*B09C 1/00* (2006.01)
*C02F 101/36* (2006.01)
*C02F 103/06* (2006.01)
*C02F 101/34* (2006.01)

(52) U.S. Cl.
CPC .............. *C02F 1/705* (2013.01); *B09C 1/002* (2013.01); *C02F 1/722* (2013.01); *C02F 2101/345* (2013.01); *C02F 2101/36* (2013.01); *C02F 2103/06* (2013.01); *C02F 2209/06* (2013.01); *C02F 2209/29* (2013.01); *C02F 2209/40* (2013.01)

(58) Field of Classification Search
CPC ...... C02F 2103/06; C02F 1/705; C02F 1/722; C02F 2305/08; C02F 2209/06; C02F 2209/29; C02F 2209/40; C02F 2101/363; C02F 2101/36; B09C 1/002; B09C 1/08
USPC .......................... 210/757, 747.8, 743, 747.7
See application file for complete search history.

(56) References Cited

U.S. PATENT DOCUMENTS

2007/0256985 A1* 11/2007 Zhao ...................... B82Y 30/00
210/757

OTHER PUBLICATIONS

Notification to Grant Patent Right dated Apr. 18, 2023 for Chinese Application No. 2022109961901.

* cited by examiner

*Primary Examiner* — Claire A Norris
(74) *Attorney, Agent, or Firm* — Miles & Stockbridge PC; Ajay A. Jagtiani

(57) ABSTRACT

The present disclosure belongs to the field of environmental protection and relates to a method for remediating groundwater chlorophenols organic contamination. The method includes determining a location of a contamination source; setting up an injection well based on the location of the contamination source; and injecting a remediation reagent into groundwater in a to-be-remediated region through the injection well so as to degrade chlorophenols organic contamination in the groundwater in the to-be-remediated region.

17 Claims, 14 Drawing Sheets

METHOD FOR REMEDIATING GROUNDWATER ORGANIC CONTAMINATION BY IN-SITU REACTION ZONE

CROSS-REFERENCE TO RELATED APPLICATIONS

This application claims benefit of priority of Chinese Application No. 2022105608817 filed May 19, 2022, and Chinese Application No. 2022109961901 filed Aug. 18, 2022. The entire contents and disclosures of these patent applications are incorporated herein by reference in their entirety.

TECHNICAL FIELD

The present disclosure relates to the technical field of in-situ groundwater remediation, in particular to a method for remediating groundwater organic contamination by an in-situ reaction zone.

BACKGROUND

In the context of the new era, the flourishing development of a chemical industry leads to increase of an industrial and agricultural output value, which is followed by an issue of environmental contamination. A chlorophenols substance, as intermediate products of organic synthesis, is common in the chemical industry, such as production of a herbicide or a bactericide and other chemicals. 2,4-dichlorophenol is a common chlorophenols pollutant and has characteristics of being difficult to degrade and high in toxicity, which will cause great harm to human health and an ecological system if it is accumulated in an environment for a long time.

For the degradation of an organic pollutants, advanced oxidation processes (AOPs) have gradually gained attention as a technology that can efficiently and quickly remove organic pollutants by using highly active oxidation species. In recent years, in the field of groundwater organic contamination remediation, nanoscale zero-valent iron (nZVI) is of wide interest and is usually used in combination with various in-situ remediation means. Based on improvement on a permeable reactive barrier (PRB) technology, a nanoscale zero-valent iron and in-situ reaction zone technology emerges. At present, there are various methods for modifying nZVI, but they are limited in a targeted point and hardly solve a problem at the same time that nZVI encounters.

CN110220766B, a method for quantitatively collecting phenol in a water environment through a composite material, and its steps are: (1) preparing a nanoscale zero-valent iron and carbon-based composite material capable of being quickly and efficiently bound to a phenol molecule; and (2) placing the nanoscale zero-valent iron and carbon-based composite material in a hydrogel or a film with a certain aperture capable of effectively controlling phenol molecule diffusion, not having a chemical action with the phenol molecule and not leaking the composite material. Within certain time, phenol diffused into an inner side may be immediately bound to the composite material by means of a diffusion action, in the film or the hydrogel, of the phenol in a to-be-tested water system, so that a constant concentration gradient is formed between an inner interface and an outer interface of the film or the hydrogel; and the nanoscale zero-valent iron on the composite material may protect the accumulated phenol against an influence of dissolved oxygen and other oxidizing substances in the water environment, so that a problem of phenol instability in a sampling process is avoided.

Besides, on the one hand, there is a difference in understanding for those skilled in the art; and on the other hand, an applicant has studied a large number of literature and patents while making the present disclosure, but not all details and contents are listed in detail due to limited space, however, it does not mean that the present disclosure does not have features of these prior arts, on the contrary, the present disclosure has had all features of the prior arts, and moreover, the applicant reserves the right of adding the related prior art to the background.

SUMMARY OF THE INVENTION

Aiming at defects in the prior art, the present disclosure provides a method for remediating groundwater 2,4-dichlorophenol contamination by an in-situ reaction zone, so as to solve an existing technical problem.

Most of pollutants in groundwater organic contamination remediated by an in-situ reaction zone technology are heavy metal or benzene series. A chlorophenols substance, as an intermediate product of organic synthesis, is common in the chemical industry. 2,4-dichlorophenol is a common chlorophenols pollutant and has characteristics of being difficult to degrade and high in toxicity, which will cause great harm to human health and an ecological system if it is accumulated in an environment for a long time, nZVI, if directly used as a reactant of an in-situ reaction zone remediation technology, has defects of being poor in electronic selectivity, prone to inactivation and poor in migration property. Accordingly, in the present disclosure, nZVI is modified based on a sulfidation mode and then clad in sodium carboxymethylcellulose (CMC), so as to further enhance its dispersibility, that is, clad modification is further performed on sulfidated nanoscale zero-valent iron with high reaction activity so as to prepare clad-type sulfidated nanoscale zero-valent iron with a good migration property and good dispersibility.

The present disclosure discloses a method for remediating groundwater chlorophenols organic contamination, including:

S1. determining a location of a contamination source;

S2. setting up an injection well based on the location of the contamination source; and S3. injecting a remediation reagent into groundwater in a to-be-remediated region through the injection well so as to degrade chlorophenols organic contamination in groundwater in the to-be-remediated region;

wherein,

S3 includes: detecting a flow rate of the groundwater in the to-be-remediated region, when the flow rate is greater than 4 m/d, the remediation reagent includes sulfidated nanoscale zero-valent iron and hydrogen peroxide, wherein an iron-sulfur ratio in the sulfidated nanoscale zero-valent iron is 15; and when the flow rate is smaller than or equal to 4 m/d, the remediation reagent includes sulfidated nanoscale zero-valent iron modified by sodium carboxymethylcellulose and hydrogen peroxide, wherein the sodium carboxymethylcellulose in the sulfidated nanoscale zero-valent iron modified by sodium carboxymethylcellulose is used at a concentration of $1.0 \text{ g·L}^{-1}$.

According to a preferred implementation, a method for preparing the sulfidated nanoscale zero-valent iron includes:
  adding absolute ethyl alcohol into a prepared $FeSO_4$ solution for stirring, dropwise adding a NaOH solution with dissolved $NaBH_4$, and then reacting to obtain nanoscale zero-valent iron; and
  adding the obtained nanoscale zero-valent iron into a prepared $Na_2S$ solution, obtaining a sulfidated nanoscale zero-valent iron suspension liquid through ultrasonic, and thereby preparing the sulfidated nanoscale zero-valent iron.

According to a preferred implementation, a method for preparing the sulfidated nanoscale zero-valent iron modified by sodium carboxymethylcellulose includes:
  adding the sulfidated nanoscale zero-valent iron into a debubbled sodium carboxymethylcellulose solution, performing ultrasonic dispersion, then freezing and shaking well to obtain a sulfidated nanoscale zero-valent iron suspension liquid modified by sodium carboxymethylcellulose, and thereby obtaining the sulfidated nanoscale zero-valent iron modified by sodium carboxymethylcellulose after magnetic separation.

According to a preferred implementation, when the flow rate is greater than 4 m/d, an addition amount of the sulfidated nanoscale zero-valent iron is 0.5 g per liter of groundwater, a concentration of $H_2O_2$ is 3 mM, and pH is 4.

According to a preferred implementation, when the flow rate is smaller than or equal to 4 m/d, an addition amount of the sulfidated nanoscale zero-valent iron modified by sodium carboxymethylcellulose is 0.6 g per liter of groundwater, a concentration of $H_2O_2$ is 5 mM, and pH is 4.

According to a preferred implementation, before injecting the remediation reagent, a concentration of $SO_4^{2-}$ in the groundwater in the to-be-remediated is adjusted to a range of 1 mM to 100 mM, and a concentration of $Cl^-$ is adjusted to a range of 1 mM to 10 mM.

According to a preferred implementation, before injecting the remediation reagent, a concentration of $HCO_3^-$ in the groundwater is less than 10 mM, and a concentration of $NO_3^-$ is less than 10 mM.

According to a preferred implementation, when the remediation reagent is injected at intervals, a next injection node of the remediation reagent is determined through change conditions of one or more monitored parameters of a pollutant concentration, a total iron concentration distribution and a pH value in the groundwater monitored in real time by each monitoring well, wherein the injection node is at least at a moment when any one or more monitored parameters have an inflection point in a range curve in data obtained from all the monitoring wells.

According to a preferred implementation, at least one processing unit capable of receiving real-time monitored data of each monitoring well is configured to analyze the injection node of the remediation reagent, w % herein, a monitoring frequency that the processing unit obtains the real-time monitored data of each monitoring well is adjusted at least in a periodic fluctuation mode based on the injection node of the remediation reagent, and a peak value of the monitoring frequency can be set higher than a peak value of a previous fluctuation period.

According to a preferred implementation, S-nZVI or CMC-S-nZVI in the remediation reagent can be recycled repeatedly under a condition of controlling a degradation rate of a pollutant to be at least greater than 70%, wherein each monitoring well can obtain real-time monitored data at a higher sampling frequency than the previous cycle when performing a new cycle, and the pollutant can be 2,4-dichlorophenol.

DETAILED DESCRIPTION

Figure 1:
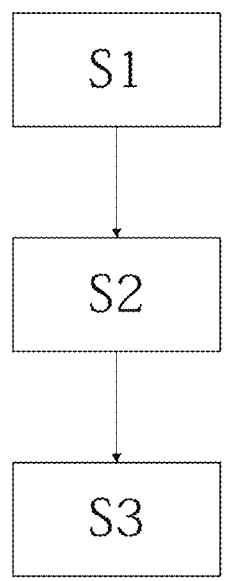
FIG. 1 is a schematic flow chart of the present disclosure.
Figure 2:
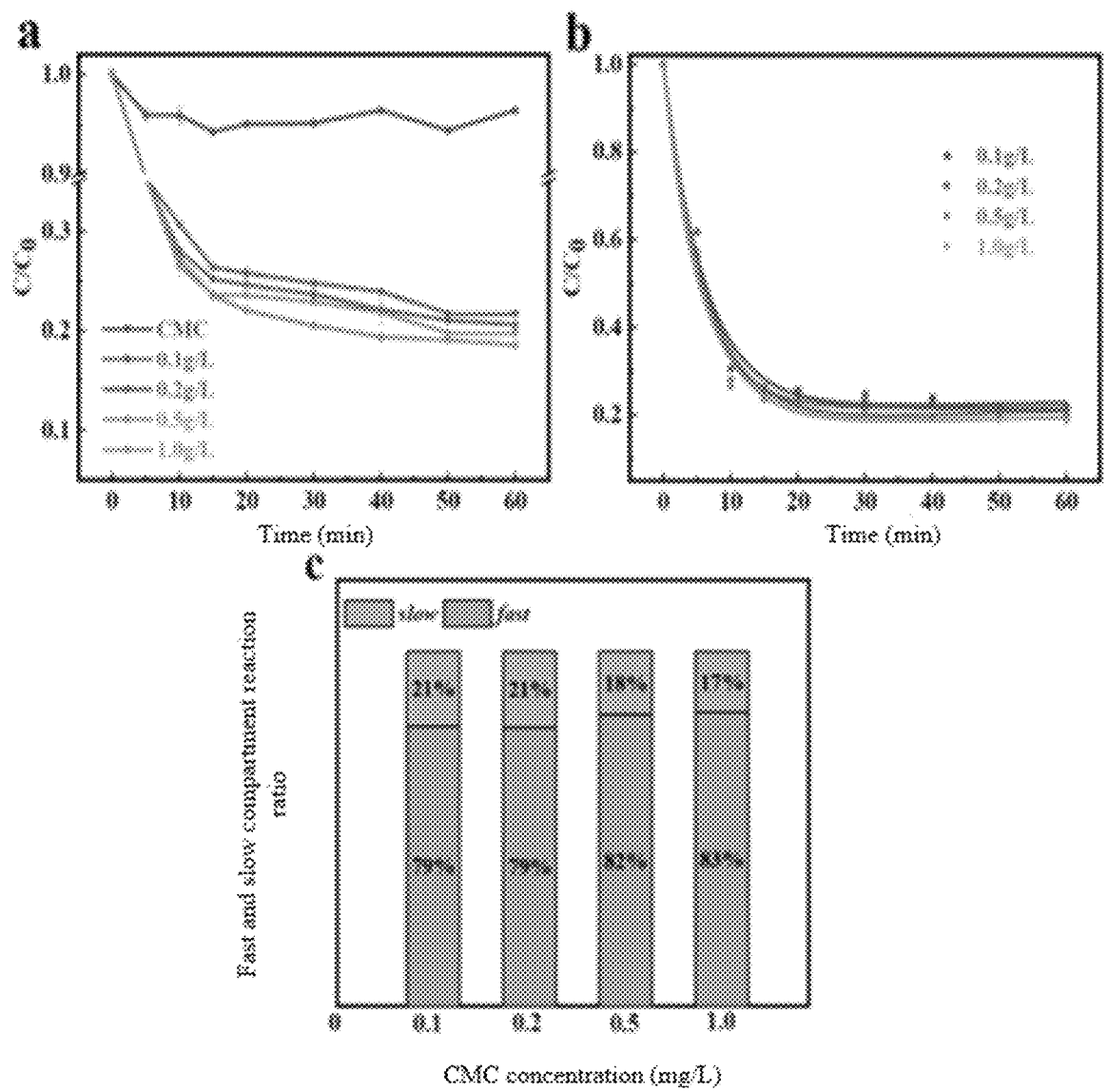
FIG. 2 is (a) an influence of a CMC concentration on 2,4-DCP degradation; (b) a two-compartment first-order kinetic fitting result; and (c) a fast and slow compartment reaction ratio in a CMC-S-nZVI/$H_2O_2$ system.
Figure 3:
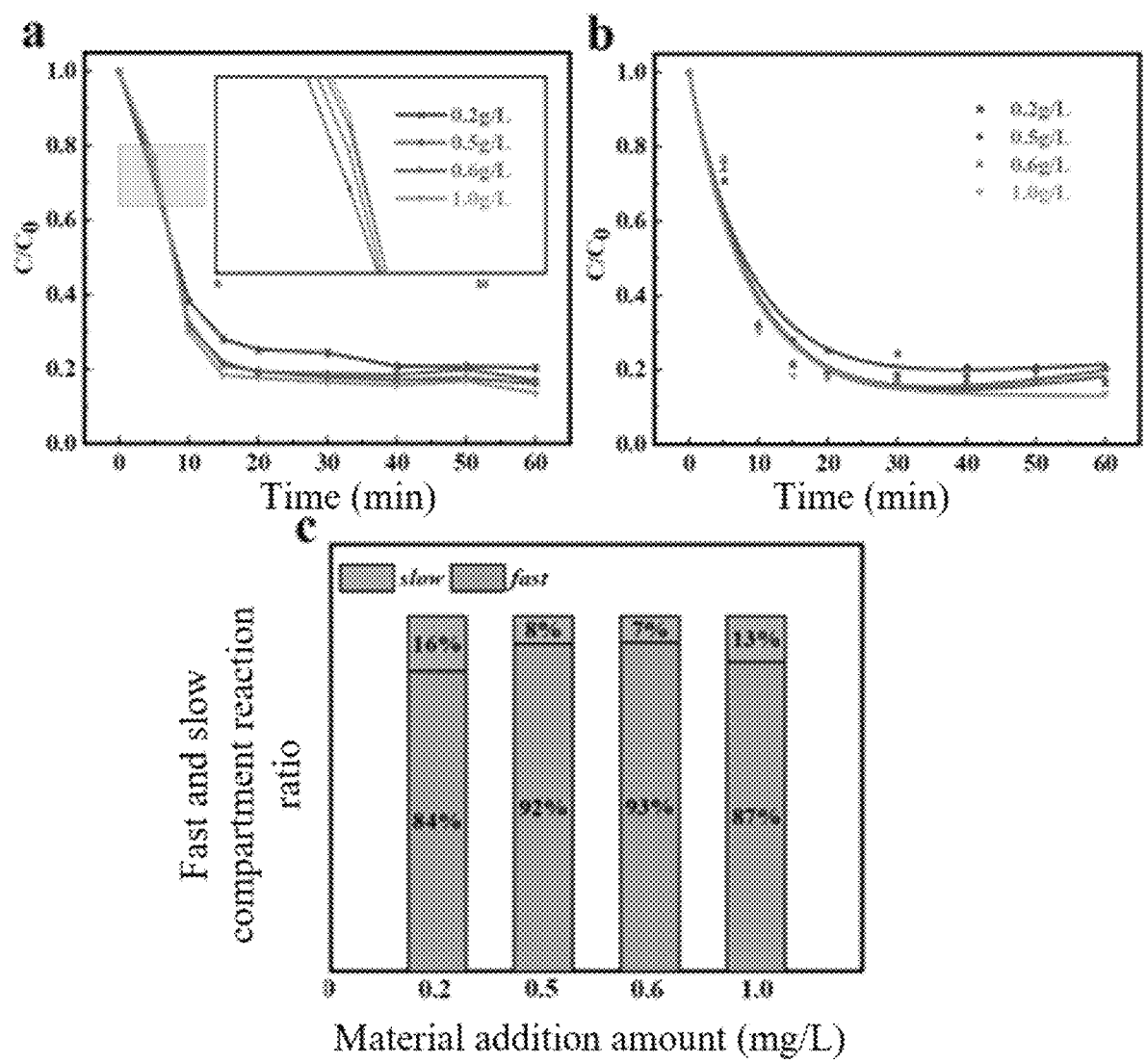
FIG. 3 is (a) an influence of an addition amount of a remediation reagent on 2,4-DCP degradation; (b) a two-compartment first-order kinetic fitting result; and (c) a fast and slow compartment reaction ratio in a CMC-S-nZVI/$H_2O_2$ system.
Figure 4:
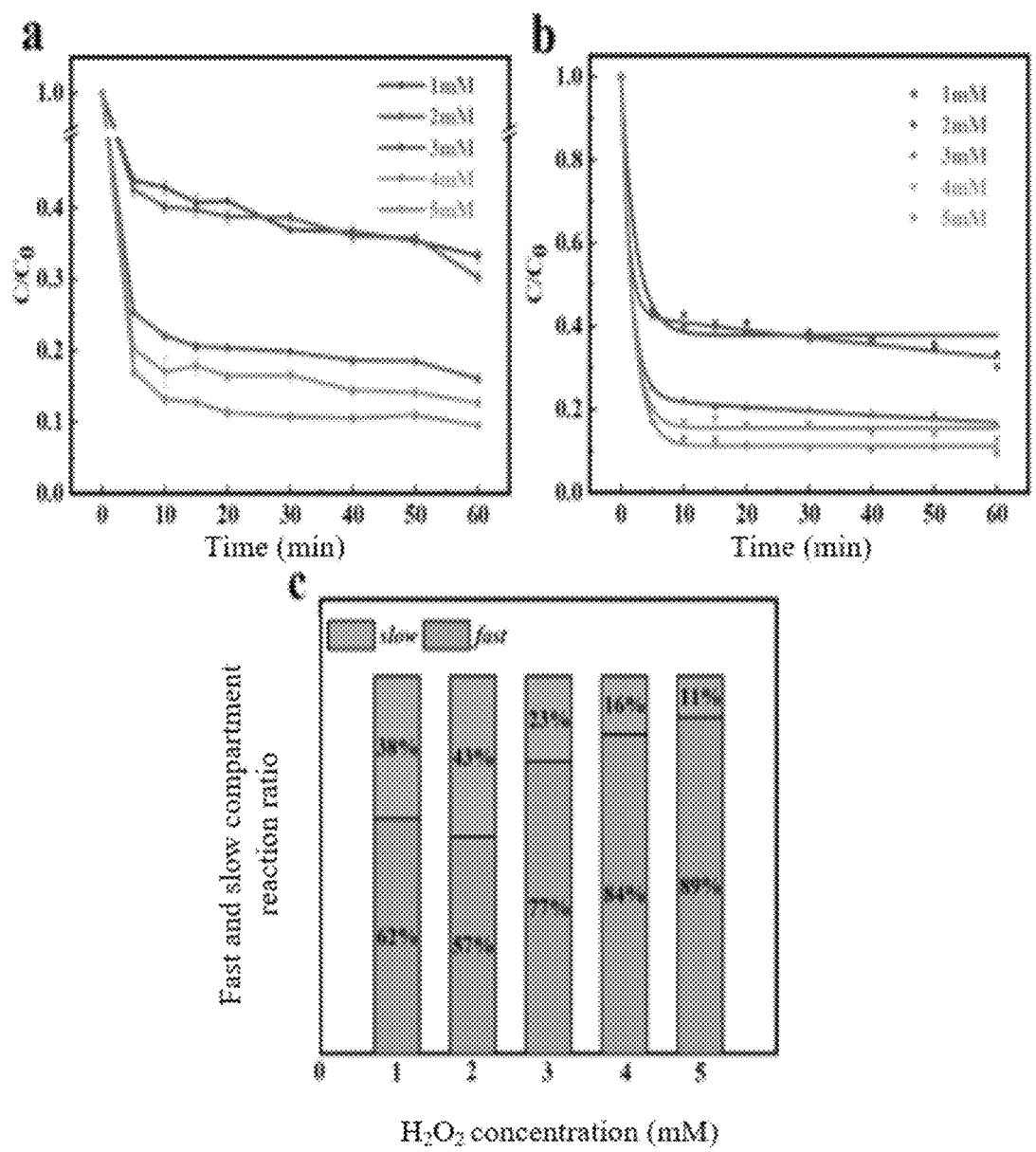
FIG. 4 is (a) an influence of a $H_2O_2$ concentration on 2,4-DCP degradation; (b) a two-compartment first-order kinetic fitting result; and (c) a fast and slow compartment reaction ratio in a CMC-S-nZVI/$H_2O_2$ system.
Figure 5:
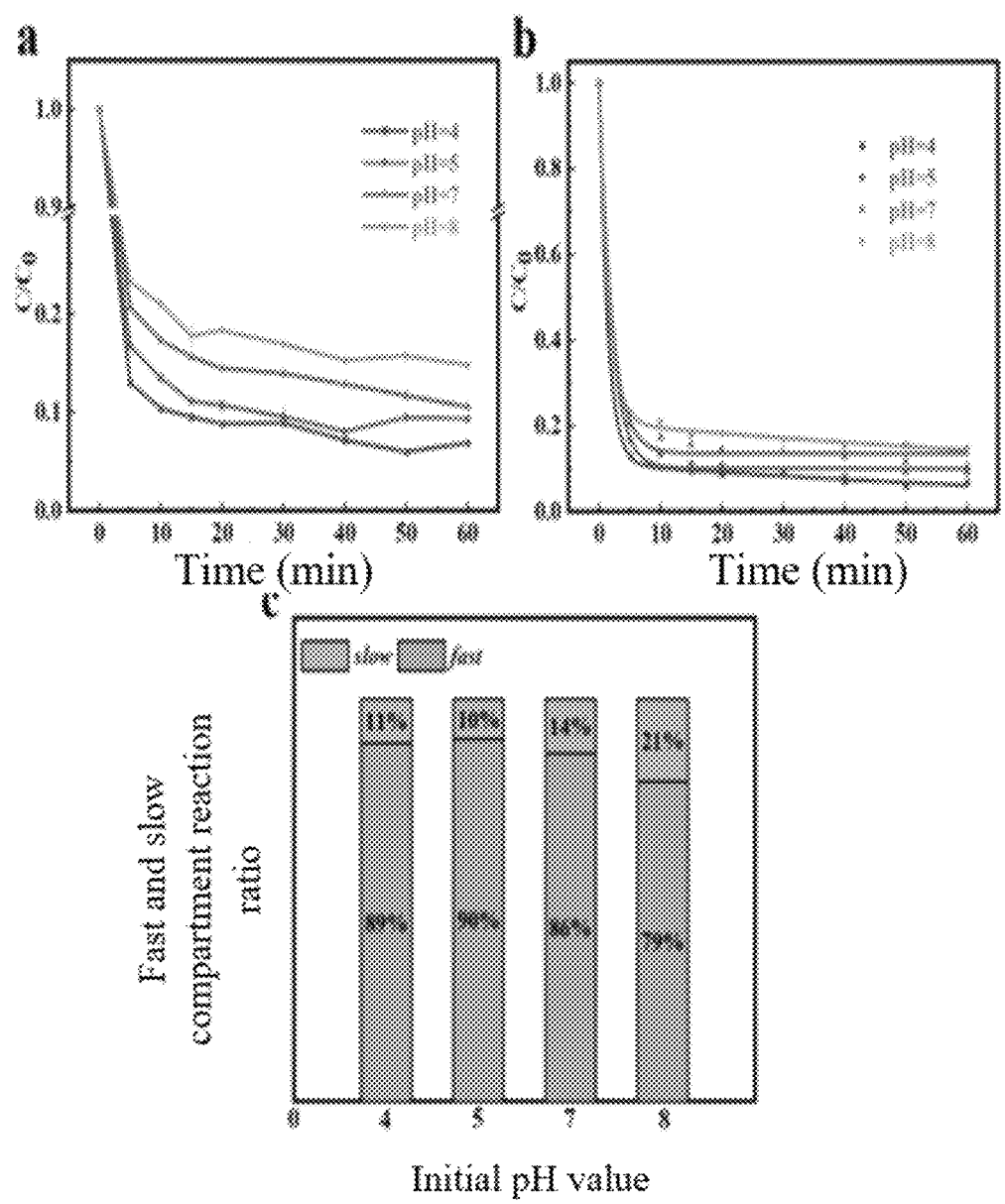
FIG. 5 is (a) an influence of a pH value concentration on 2,4-DCP degradation; (b) a two-compartment first-order kinetic fitting result; and (c) a fast and slow compartment reaction ratio in a CMC-S-nZVI/$H_2O_2$ system.
Figure 6:
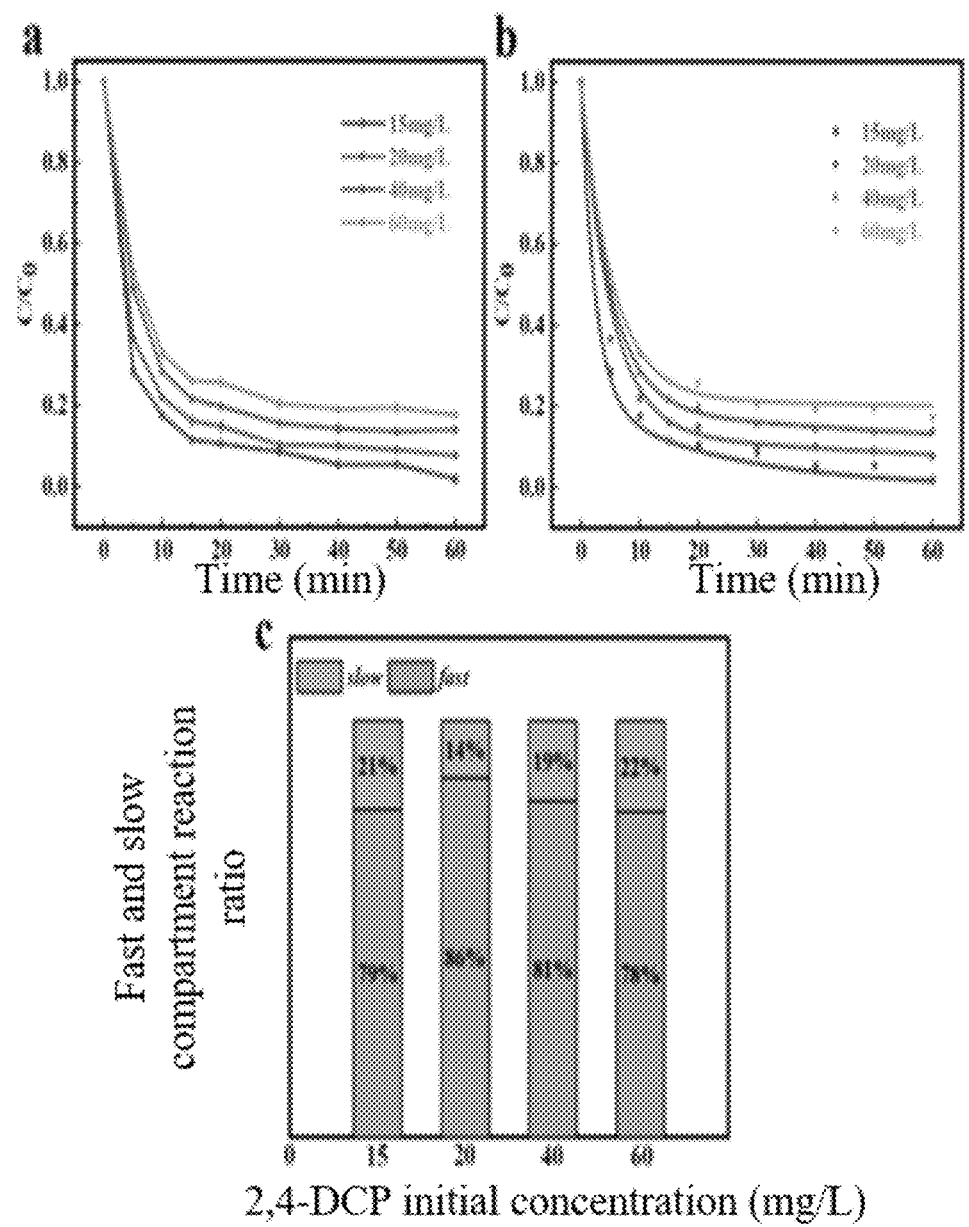
FIG. 6 is (a) an influence of an initial pollutant concentration on 2,4-DCP degradation; (b) a two-compartment first-order kinetic fitting result; and (c) a fast and slow compartment reaction ratio in a CMC-S-nZVI/$H_2O_2$ system.

Detailed description is made below with reference to the accompanying drawings.

The present disclosure discloses a method for remediating groundwater chlorophenols organic contamination, which may also be a method for remediating groundwater 2,4-dichlorophenol contamination by an in-situ reaction zone.

Preferably, this embodiment will use 2,4-dichlorophenol as a target organic pollutant to be removed.

Preferably, the present disclosure uses a CMC-S-nZVI/$H_2O_2$ system to implement remediation for groundwater organic contamination. The CMC-S-nZVI/$H_2O_2$ system is a composition capable of removing an organic pollutant. CMC-S-nZVI may serve as a catalyst of $H_2O_2$, so as to remove the organic pollutant efficiently and quickly by using high-activity oxidation species. CMC-S-nZVI may be called a clad-type sulfidated nanoscale zero-valent iron. Preferably, the organic pollutant may include 2,4-dichlorophenol (2,4-DCP).

According to a preferred implementation, the method includes the following steps:

S1. A location of a contamination source is determined.

A plurality of monitoring wells are arranged in a to-be-remediated region so as to determine components and a concentration distribution condition of a pollutant in groundwater through sampling of at least two times by the monitoring wells.

S2. An injection well is set up based on the location of the contamination source.

Observation is performed in a flowing direction of the groundwater in the to-be-remediated region, and at least one injection well as deep as an aquifer may be set up in a position in an upstream direction of groundwater flowing of the contamination source based on the components and the concentration distribution condition of the pollutant in the groundwater.

S3. A remediation reagent is injected through the injection well so as to degrade the organic pollutant.

The remediation agent is injected continuously or at intervals through one or more injection wells based on the components and the concentration distribution condition of the pollutant in the groundwater, the remediation reagent, after an in-situ reaction, can form a reaction zone based on a migration effect, and real-time monitoring is performed at each monitoring well. Further, the monitoring wells in different positions can monitor a forming condition of the reaction zone in real time by obtaining a 2,4-DCP concentration, a total iron concentration, a pH value and one or more indexes in a redox potential, injection of the injection well is stopped when the reaction zone reaches an expected diffusion range, and monitoring is continued through the monitoring wells, so as to determine stability of the reaction zone.

Preferably, the remediation agent may select an S-nZVI/$H_2O_2$ system, and S-nZVI can be prepared with $FeSO_4 \cdot 7H_2O$ as an iron source and $Na_2S \cdot 9H_2O$ as a sulfur source through an ultrasonic load.

Further, specific steps for preparing the S-nZVI are as follows:

(1) Preparation of nanoscale zero-valent iron
  (a) Preparation of anaerobic water: continuously feeding $N_2$ into deionized water to obtain anaerobic water for standby application;
  (b) preparing a $FeSO_4 \cdot 7H_2O$ solution: dissolving $FeSO_4 \cdot 7H_2O$ in pure water;
  (c) pouring a mixed solution into a container, adding absolute ethyl alcohol for uniform stirring so as to dilute and disperse a solute, so a particle diameter of synthetic nanoscale iron particles is smaller;
  (d) excessive $NaBH_4$ is dissolved in a 0.1% NaOH solution, thus adding the mixed solution into the container in an approximate uniform speed and dropwise mode, and quickly stirring for a full reaction, wherein $N_2$ is continuously fed in a reaction process so as to maintain an anaerobic reaction environment; and
  (e) subjecting black nanoscale iron particles obtained through a reaction to magnetic separation, washing, drying and grinding to obtain a sample.

(2) Preparation of the sulfidated nanoscale zero-valent iron
  (a) preparing a $Na_2S \cdot 9H_2O$ solution: dissolving $Na_2S \cdot 9H_2O$ in pure water with a corresponding volume;
  (b) adding the nZVI obtained in step (1) into the above $Na_2S \cdot 9H_2O$ solution, and obtaining a sulfidated nanoscale zero-valent iron suspension liquid through ultrasonic; and
  (c) subjecting sulfidated particles to water washing, drying and grinding to obtain a sample.

Further, on the basis of the prepared sulfidated nanoscale zero-valent iron (S-nZVI), clad-type sulfidated nanoscale zero-valent iron (CMC-S-nZVI) may be obtained through processing through the following steps:

(3) Preparation of the clad-type sulfidated nanoscale zero-valent iron
  (a) fully dissolving sodium carboxymethylcellulose (CMC) in anaerobic deionized water under the condition of magnetic stirring, and removing bubbles in a solution through ultrasonic;
  (b) adding the S-nZVI obtained in step (2) into the CMC solution in ①, performing ultrasonic dispersion, and then placing on a thermostatic waterbath freezing shaking table for shaking well to obtain a CMC-S-nZVI suspension liquid; and
  (c) subjecting the CMC-S-nZVI suspension liquid to magnetic separation, and then water washing, drying and grinding to obtain a sample.

Preferably, the present disclosure may represent a structure and surface physical and chemical properties of the CMC-S-nZVI through various means, so as to determine an essential feature of the remediation reagent. The representation means may include: a scanning electron microscope (SEM), a fourier transform infrared spectroscopy (FTIR), an X-ray diffractometer (XRD), a Zeta potential meter, a settling property test and the like.

Preferably, dried CMC-S-nZVI is in an irregular sphere shape in whole, and an aggregation phenomenon thereof is improved compared with S-ZVI.

Preferably, the same COO-characteristic peak appears in CMC and CMC-S-nZVI, which shows that CMC is bound to a surface of the S-nZVI.

Preferably, a CMC characteristic peak appears in the CMC-S-nZVI, and the CMC-S-nZVI and the S-nZVI have planes (110) and (200) of a zero-valent iron body centred cube (BCC) crystal structure in positions where $2\theta$ is 44.9° and 63.2°, so it further shows that preparation of the CMC-S-nZVI succeeds.

Preferably, on the basis of the S-nZVI, CMC modification further reduces its isoelectric point (IEP) to 4.5, and dispersibility of the remediation reagent is enhanced in a mode of increasing a surface charge.

Preferably, through the settling property test, it may be known that the CMC-S-nZVI has better dispersibility than the S-nZVI and nZVI.

Preferably, the plurality of monitoring wells are arranged in the to-be-remediated region, so as to determine the components and the concentration distribution condition of the pollutant in the groundwater, an existence form and a location of the pollutant in the groundwater are analyzed according to physical and chemical property of a main contamination component, a groundwater system feature and pollutant concentration monitored information, a distribution range of the main contamination component in a plane and a vertical direction is circled in contrast with a background value of the to-be-remediated region, the physical and chemical property may include a solubility, density and the like, and the existence form of the pollutant in the groundwater may include an NAPL phase, a dissolved phase and the like.

Preferably, the one or more injection wells may be set up in upstream in a flowing direction of the groundwater of the contamination source, a space among the plurality of injection wells may be 1-2 m, so that the remediation reagent added from the injection wells may form the reaction zone based on a concentration difference and a groundwater flow action.

Preferably, the remediation reagent may be injected into the to-be-remediated region continuously or at intervals from the one or more injection wells, an injection mode of injecting the remediation reagent into the injection wells is at least based on an initial injection mode determined according to monitored soil medium particle diameter and/or groundwater flow rate, and dynamic adjustment is performed based on real-time monitored data obtained in a remediation process.

Further, as for the continuous injection mode, a total injection amount, an injection amount in unit time and an injection duration of the remediation reagent may be adjusted based on a pollutant concentration in the groundwater, a total iron concentration distribution and/or the pH value.

Further, as for the interval injection mode, an injection position, an injection amount at a time and/or an injection frequency may be adjusted at least based on the pollutant concentration, the total iron concentration distribution and/or the pH value in the groundwater monitored in real time by each monitoring well.

Preferably, at least one processing unit capable of receiving the real-time monitored data is configured, so that the processing unit can provide an adjusting mode of an injection amount and/or the injection mode of the remediation reagent.

Preferably, the processing unit can obtain a monitored parameter related to time by using a real-time data change value of a monitored parameter reaching a corresponding preset unit variable as a driving event. The monitored parameter may include the pollutant concentration, the total iron concentration distribution and the pH value in the groundwater. The preset unit variable is expected data obtained through a simulation of a process of remediating based on a contamination condition of the current to-be-remediated region, and is divided into several groups of one unit data associated with time information according to a certain rule. When a monitored data change value obtained by the monitoring well reaches the preset unit variable, the processing unit can perform recording and analysis in response to the driving event, and it is judged as abnormal data when a difference between consumed time between two times of the driving event and time information corresponding to the preset unit variable exceeds a preset threshold. The preset threshold related to the time information is a set permissible error. Preferably, a change tendency of the pollutant concentration, the total iron concentration distribution and the pH value in the groundwater obtained by any monitoring well in the remediation process is approximately the same, and when judging that any one of the above monitored parameters has the abnormal data, the processing unit can confirm mistaken monitoring reporting based on a change condition of the other monitored parameters except for the monitored parameter, so as to prevent mistaken reporting of the abnormal data.

Further, the change tendency of the monitored parameters in the remediation process is approximately: after injecting the remediation reagent, based on a dilution effect and oxidative degradation of the remediation reagent for the pollutant, the pollutant concentration nearby the injection well and in a downstream region is reduced rapidly, the total iron concentration distribution is nearby the injection well and the downstream region, the pH value in a region nearby the injection well is reduced rapidly, and a certain acid region is formed. Meanwhile, the pH value in the downstream region is also reduced. With continuous injection of the remediation reagent, the in-situ reaction zone formed by the CMC-S-nZVI and $H_2O_2$ gradually migrates downstream under the action of a water flow, a concentration of the 2,4-DCP in the downstream region of the injection well is further reduced, a region with a higher total iron concentration moves downstream, and a range with a lower pH value also moves downstream. After the remediation reagent is further consumed, a range of an in-situ remediation region keeps smaller, within an upstream region of the injection well, the concentration of the 2,4-DCP is gradually increased again, range of the total concentration distribution is gradually reduced, and the pH value keeps increased again till the remediation reagent is reacted completely.

Preferably, the processing unit may adjust the injection amount and/or the injection mode of the remediation reagent when judging that the abnormal data exist.

Preferably, the processing unit can adjust the monitoring frequency in a periodic fluctuation mode with injection of the remediation reagent as a node, a peak value of the monitoring frequency can be set higher than a peak value of a previous fluctuation period. The monitoring frequency can further be adjusted to a corresponding peak value in a case that the processing unit judges that the abnormal data exist and eliminates mistaken monitoring reporting, so that more monitored data can be obtained with a relatively highest monitoring frequency, and thus a change condition of an abnormal value is further tracked. Preferably, the monitoring frequency can change in fluctuation rise along continuation of remediation time by using injection of the remediation reagent as the node.

Further, the processing unit may execute adjustment of the monitoring frequency and adjustment of the injection amount and/or the injection mode of the remediation reagent at the same time when judging that the abnormal data exist and eliminating mistaken monitoring reporting, when the remediation reagent is added into the injection well in a new injection mode, a node of a fluctuation period may be triggered, and the processing unit is caused to further adjust the peak value of the monitoring frequency much higher than the peak value of the previous fluctuation period.

In this way, the present disclosure can better determine a corresponding preset unit variable based on different monitored parameters with the monitored parameters as a guidance, and then determine the corresponding driving event. Compared with monitoring at a fixed time interval, higher flexibility, adaptability and accuracy are achieved. Injection and monitoring of the remediation reagent have delay, an abnormal case, when occurring, may not be discovered in time if the fixed time interval is adopted, and a secondary delay occurs, so a remediation effect and efficiency are affected. Transmission, storage and calculation amount is increased due to frequently collected data when no abnormal case occurs, and the secondary delay also occurs, so a large loss has been caused when the abnormal data are discovered, especially, during forming and reaction of the in-situ reaction zone, if narrowing and even breaking of the reaction zone are caused by the secondary delay, more cost needs to be spent on achieving an expected remediation effect.

Preferably, according to Fe/S from high to low, a degradation effect of the S-nZVI/$H_2O_2$ system on the 2,4-DCP is sequentially: Fe/S=15>10>20>5. Too high and too low Fe/S do not benefit degradation of the 2,4-DCP, because a too thick sulfidated layer blocks electron transport between zero-valent iron in a material and the 2,4-DCP. Meanwhile, $FeS_n$ generated in this process also consumes activity of $Fe^0$, resulting in reduction of particle activity. Appropriate Fe/S can effectively reduce loss of electrons to a side reaction in the reaction process, electron transport between the $Fe^0$ and the 2,4-DCP is facilitated, and thus degradation of the 2,4-DCP is promoted.

Preferably, an iron-sulfur ratio may be selected as 15.

According to a preferred implementation, the present disclosure may determine best numerical values of a part of adjustable parameters based on a tendency of an influence of different factors on the 2,4-DCP degradation. The tendency of the influence of the different factors on the 2,4-DCP degradation is shown in FIG. 2 to FIG. 6.

Further, the influence of the different factors on 2,4-DCP degradation is suitable for a two-compartment first-order kinetic model of fast and slow compartments, determination coefficients are all greater than 0.9436. A degradation rate of the 2,4-DCP is more affected by an initial pH value and a $H_2O_2$ concentration, and less affected by a CMC concentration and an addition amount, compared with an alkaline condition, an acidic condition is more beneficial for 2,4-DCP degradation, and a lower initial pollutant concentration makes it easier to degrade.

Preferably, the best numerical values of the part of adjustable parameters are: the concentration of the sodium carboxymethylcellulose is 1.0 g·L$^{-1}$; an addition amount of the CMC-S-nZVI is 0.6 g·L$^{-1}$; the concentration of $H_2O_2$ is 5 mM; and reaction initial pH is 4.

Figure 7:
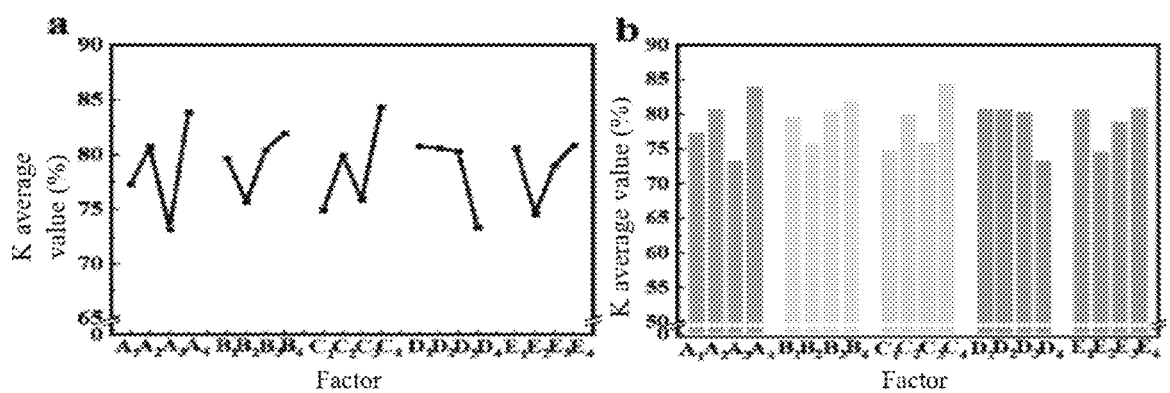
FIG. 7 is an orthogonal experiment result of degrading 2,4-DCP by a CMC-S-nZVI/$H_2O_2$ system.

Further, best parameter numerical values of the 2,4-DCP degradation are optimized through an orthogonal experiment, and an experiment result is shown in FIG. 7. The orthogonal experiment result shows that a primary and secondary sequence of the influence of each factor on 2,4-DCP degradation is: CMC concentration>$H_2O_2$ concentration>initial pH>2,4-DCP initial concentration>remediation addition amount. An obtained best combination is: the CMC concentration is 1.0 g/L, the $H_2O_2$ concentration is 5 mM, the pH is 4, the 2,4-DCP initial concentration is 60 mg·L$^{-1}$, wherein the 2,4-DCP initial concentration does not belong to the adjustable parameters.

Preferably, the present disclosure may change the remediation process based on different ions contained in a groundwater environment in the to-be-remediated region. Common ions in the groundwater environment may include Cl$^-$, $NO_3^-$, $HCO_3^-$ and $SO_4^{2-}$. FIG. 8 to FIG. 11 show an influence of co-existing ions on the remediation effect.

Figure 8:
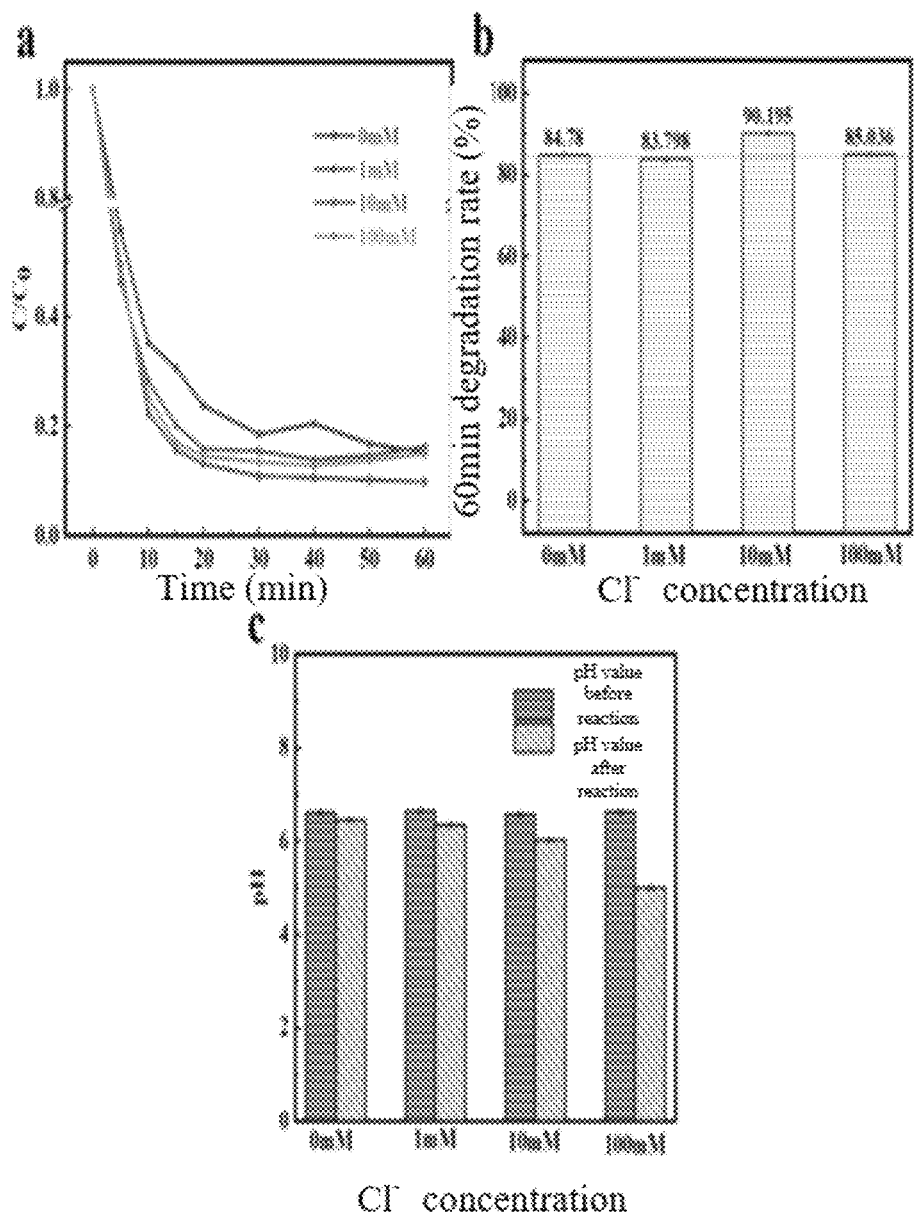
FIG. 8 is (a) an influence of $Cl^-$ on a degradation system; (b) a degradation rate of 2,4-DCP within 60 min; and (c) change of a pH value before and after a reaction in a CMC-S-nZVI/$H_2O_2$ system.

Preferably, it may be seen from FIGS. 8 (a) and (b) that introduction of Cl$^-$ has a certain promoting effect on 2,4-DCP degradation by a CMC-S-nZVI/$H_2O_2$ system. When no co-existing ion exists, the degradation rate of the 2,4-DCP within 60 min is 84.78%. With a Cl$^-$ concentration being increased from 1 mM to 10 mM, the degradation rate of the 2,4-DCP by the system finally rises from 83.79% to 90.19%, mainly because a complex formed by Cl$^-$ and $Fe^0$ in a solution accelerates breakdown of a passivation layer, and meanwhile, a local corrosion effect of Cl$^-$ also facilitates this process. At the moment, corrosion of a surface of the CMC-S-nZVI is more beneficial for releasing of $Fe^{2+}$/$Fe^{3+}$, and thus more OH are generated by catalyzing. However, too many Cl$^-$ are not beneficial for 2,4-DCP degradation by the system, when the concentration of the added Cl$^-$ is 100 mM, the degradation rate of the 2,4-DCP is reduced to 85.03% instead, because $Fe^{2+}$ may react with redundant Cl$^-$, consequently, akaganeite (β-FeOOH) with poor electrical conductivity is generated on a surface of the remediation reagent and blocks electron transport between the CMC-S-nZVI and the 2,4-DCP, which is not beneficial for 2,4-DCP degradation. pH before and after a solution reaction is measured, a result is shown in FIG. 8 (c), which discovers that pH of the solution after reaction is all reduced, because in the process of 2,4-DCP degradation by the system, a certain amount of hydrochloric acid may be generated, a content of H$^+$ in the solution is increased, and thus the pH value of the solution is reduced.

Figure 9:
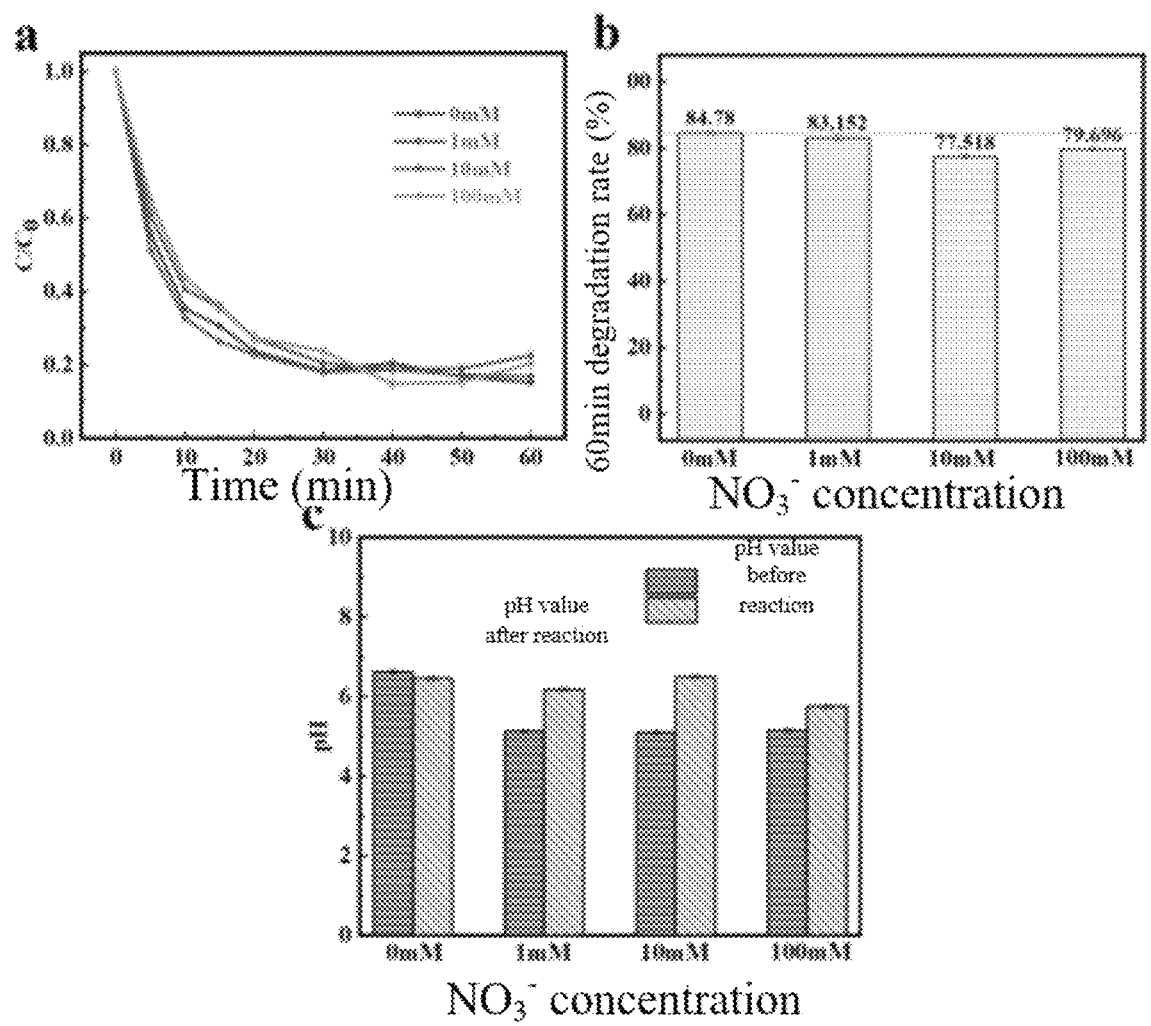
FIG. 9 is (a) an influence of $NO_3^-$ on a degradation system; (b) a degradation rate of 2,4-DCP within 60 min; and (c) change of a pH value before and after a reaction in a CMC-S-nZVI/$H_2O_2$ system.

Preferably, it may be discovered from FIG. 9 (a) that introduction of $NO_3^-$ has an inhibiting effect on 2,4-DCP degradation by the CMC-S-nZVI/$H_2O_2$ system, within a study range, an inhibiting effect caused by the $NO_3^-$ is related to its concentration. If may be known from FIG. 9 (b) that under the condition of no co-existing ion, the degradation rate of the 2,4-DCP by the CMC-S-nZVI/$H_2O_2$ system within 60 min is 84.78%. In the system, under the condition that the $NO_3^-$ concentration is 1 mM, 10 mM and 100 mM, the degradation rates of the 2,4-DCP within 60 min are respectively 83.15%, 77.51% and 79.69%, because on the one hand, the $NO_3^-$ adsorbed on the surface of the CMC-S-nZVI may occupy a reaction active site, so 2,4-DCP degradation is reduced. Similarly, a ferric iron oxide generated by reaction of $NO_3^-$ and an iron ion also shortens a life of the remediation reagent; and on the other hand, the $NO_3^-$ may react with OH generated in the solution, resulting in consumption of an active free radical and then reduction of OH for 2,4-DCP degradation. OH$^-$ generated in this process is also a reason that the solution pH value after reaction is increased, as shown in FIG. 9 (c).

Figure 10:
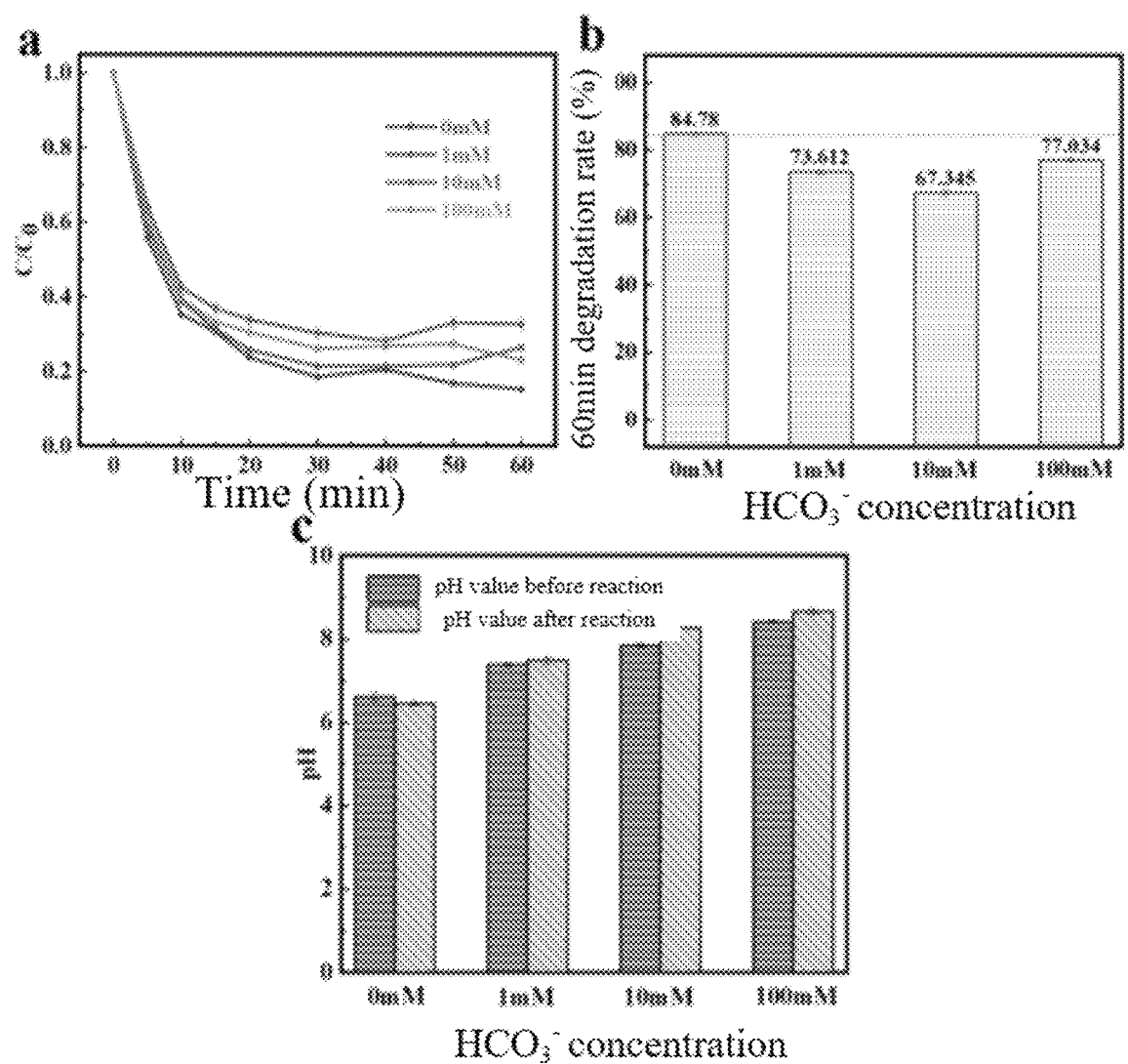
FIG. 10 is (a) an influence of $HCO_3$ on a degradation system; (b) a degradation rate of 2,4-DCP within 60 min; and (c) change of a pH value before and after a reaction in a CMC-S-nZVI/$H_2O_2$ system.

Preferably, it may be seen from FIGS. 10 (a) and (b) that compared with $NO_3^-$, an inhibiting effect of $HCO_3^-$ on a reaction system is more obvious. With increase of an $HCO_3^-$ concentration, the degradation rate of the 2,4-DCP by the CMC-S-nZVI/$H_2O_2$ system is reduced. Within 60 min, under the condition that the $HCO_3^-$ concentration is respectively 0 mM, 1 mM, 10 mM and 100 mM, the degradation rates of the 2,4-DCP by the CMC-S-nZVI/$H_2O_2$ system are respectively: 84.78%, 73.61%, 67.34% and 77.03%. The HCO; has a capturing capability for a free radical such as ·OH and can consume the ·OH by reacting with the ·OH, a generated carbonate active free radical ($CO_3^{-}$·) has far less oxidizing ability than ·OH, then oxidative degradation for the organic pollutant cannot be effectively completed, so the degradation rate of the 2,4-DCP may be reduced due to reduction of the ·OH in an experiment process. It may be seen from FIG. 10 (c) that the higher the $HCO_3^-$ concentration is, the greater the initial pH value of the solution is, because a source $NaHCO_3$ of co-existing ions is a strong alkali and weak acid salt, and OH$^-$ may be generated by $HCO_3^-$ hydrolysis. Iron ions in the solution and on the surface of the remediation reagent may be easier to oxidize under the condition of higher pH. A formed oxide and hydroxide mixed passivation layer covers the surface of the remediation reagent, which further blocks $Fe^0$ corrosion, thus inhibits catalytic generation of the ·OH and finally results in reduction of the degradation rate of the 2,4-DCP.

Figure 11:
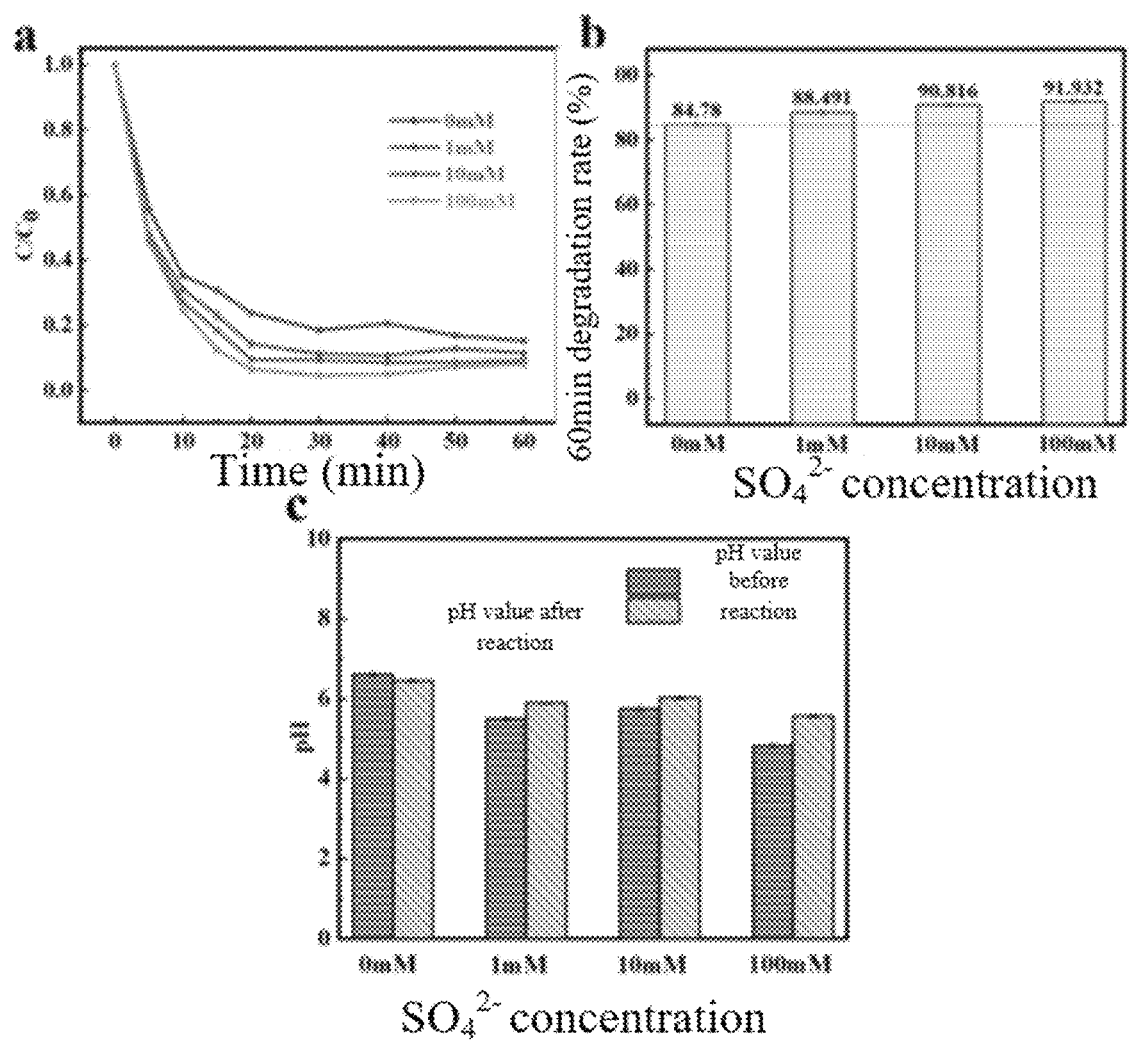
FIG. 11 is (a) an influence of $SO_4^{2-}$ on a degradation system; (b) a degradation rate of 2,4-DCP within 60 min; and (c) change of a pH value before and after a reaction in a CMC-S-nZVI/$H_2O_2$ system.
Figure 12:
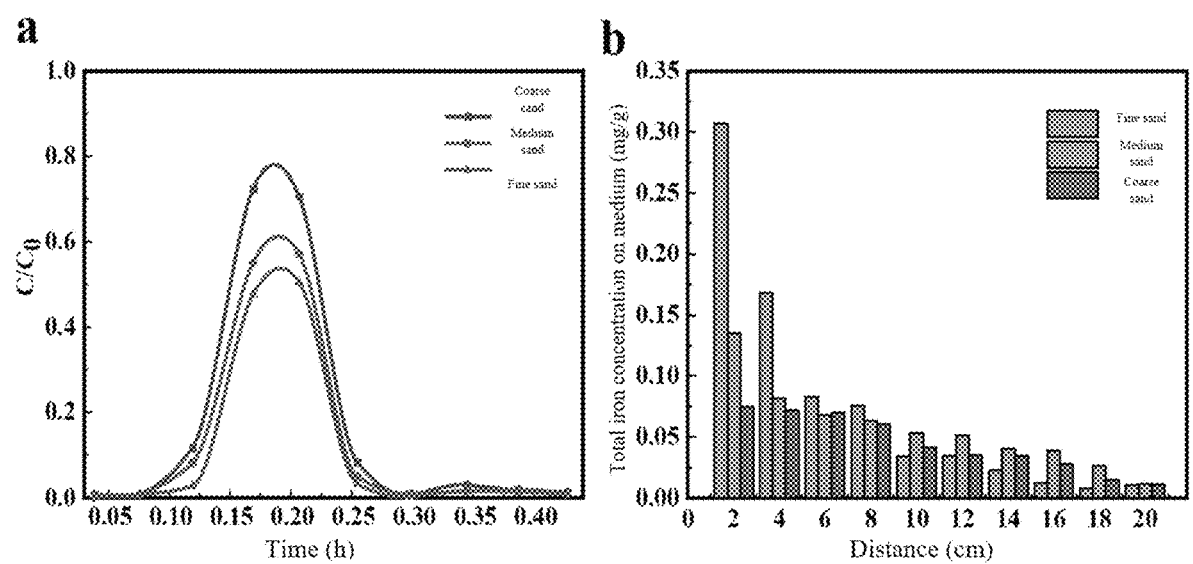
FIG. 12 is (a) a CMC-S-nZVI breakthrough curve; and (b) a residual amount of CMC-S-nZVI on a medium under different medium particle diameters.
Figure 13:
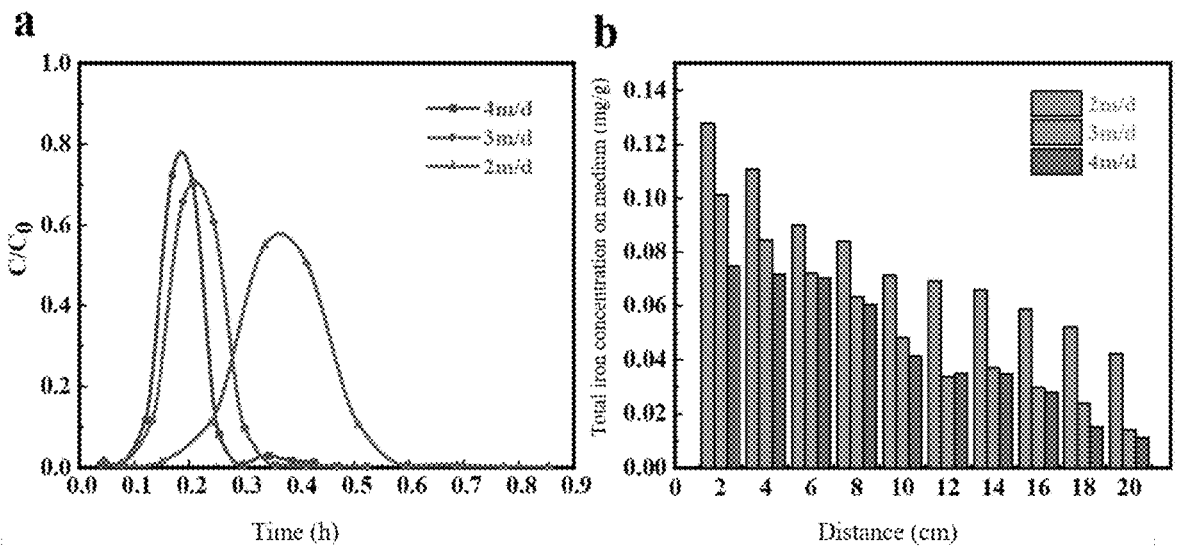
FIG. 13 is (a) a CMC-S-nZVI breakthrough curve; and (b) a residual amount of CMC-S-nZVI on a medium under different groundwater flow rates.
Figure 14:
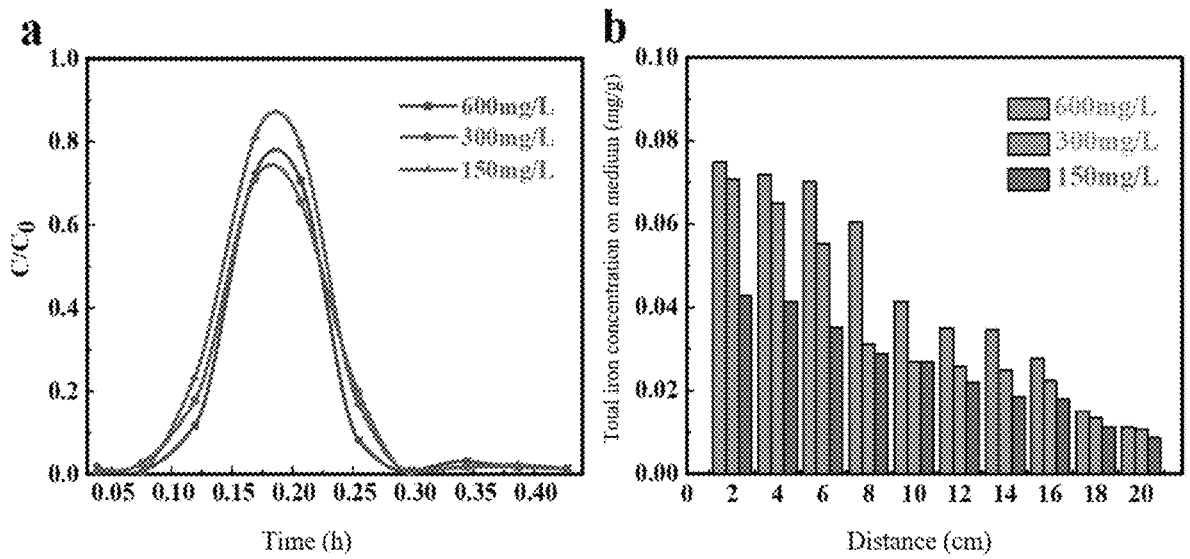
FIG. 14 is (a) a CMC-S-nZVI breakthrough curve; and (b) a residual amount of CMC-S-nZVI on a medium under different injection concentrations.
Figure 15:
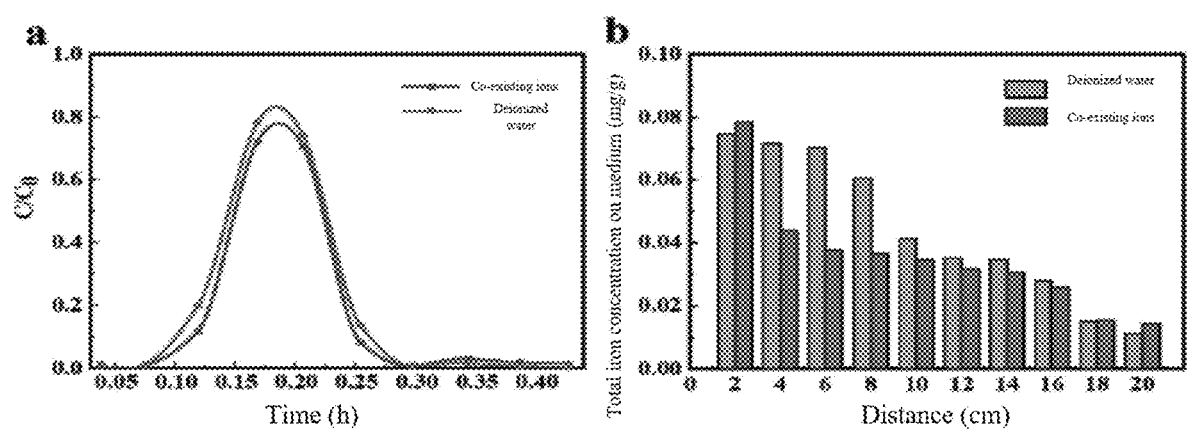
FIG. 15 is (a) a CMC-S-nZVI breakthrough curve; and (b) a residual amount of CMC-S-nZVI on a medium under a co-existing ion condition.

Preferably, with reference to FIGS. 11 (a) and (b), it may be known that introduction of $SO_4^{2-}$ has a promoting effect on 2,4-DCP degradation by the CMC-S-nZVI/$H_2O_2$ system. Within a study range, the degradation rate of the 2,4-DCP by the system is gradually increased with increase of an $SO_4^{2-}$. Within 60 min, degradations of the 2,4-DCP corresponding to 1 mM, 10 mM and 100 mM of $SO_4^{2-}$ in the system are respectively: 88.49%, 90.81% and 91.93%, because the $SO_4^{2-}$ in the solution may by strongly absorbed on an surface of an iron oxide, replaces a surface hydroxyl group and forms a monodentate or didentate complex with surface iron, so as to accelerate nZVI corrosion, and this corrosion effect is enhanced with increase of the $SO_4^{2-}$ concentration. In this process, more ·OH generated by catalyzing $H_2O_2$ by $Fe^{2+}/Fe^{3+}$ will exist in the solution, and thus 2,4-DCP degradation is facilitated.

Preferably, the present disclosure may introduce a part of $SO_4^{2-}$ and/or $Cl^-$ into the remediation reagent without additionally introducing a pollutant so as to promote the degradation process.

Further, an introduction amount of the $SO_4^{2-}$ may be controlled within a range of 1 mM to 100 mM; an introduction amount of the $Cl^-$ may be controlled within a range of 1 mM to 10 mM, and an introduction amount of the $SO_4^{2-}$ and/or the $Cl^-$ is adjusted at least based on a corresponding original ion concentration in the groundwater in the to-be-remediated region.

Preferably, before injecting the remediation reagent, an original concentration of the co-existing ions in the groundwater in the to-be-remediated region is obtained through the monitoring well, when it is monitored that the groundwater in the to-be-remediated region contains $HCO_3^-$ and/or $NO_3^-$ the $HCO_3^-$ and/or $NO_3^-$ in the groundwater can be reduced or removed in a pre-treatment mode.

Further, the concentration of the $HCO_3^-$ and/or $NO_3^-$ needs to be reduced to at least 1 mM in pre-treatment.

Preferably, in the CMC-S-nZVI/$H_2O_2$ system, the CMC-S-nZVI, as a catalyst of the $H_2O_2$, may be recycled, the degradation rate of the 2,4-DCP is in a reducing tendency with increase of the number of cycle times, and a reducing range is gradually widened with increase of the number of cycle times. The number of recycling times also changes based on a difference of a set threshold of the degradation. For example, when the set threshold of the degradation rate is 70%, the number of recycling times may reach 10.

Preferably, the present disclosure may perform one-dimension and/or two-dimension simulation for remediating 2,4-DCP contamination by an CMC-S-nZVI/$H_2O_2$ in-situ reaction zone through a simulation experiment, so as to obtain a migration distribution law and an expected remediation effectiveness of the CMC-S-nZVI in an aquifer.

A migration capacity of the CMC-S-nZVI in the aquifer is affected by a medium particle diameter, a groundwater flow rate, an initial concentration of remediation reagent injection and the co-existing ions. FIG. 12 to FIG. 15 show influences of the medium particle diameter, the groundwater flow rate, the injection concentration of the remediation reagent and the co-existing ions on a material migration property respectively.

The medium particle diameter can remarkably affect the migration property of the CMC-S-nZVI in the aquifer. Coarse sand is more beneficial for migration of the CMC-S-nZVI. Increase of the medium particle diameter may increase porosity among particles, so that a mechanical capturing capability of a medium for the CMC-S-nZVI is weakened, and more CMC-S-nZVI may migrate out along with an outflow fluid.

With increase of the groundwater flow rate, a highest relative outflow concentration ratio of the CMC-S-nZVI keeps increasing, finally, causing a highest outflow peak to appear in advance, that is, a larger flow rate may be more beneficial for migration out of the CMC-S-nZVI. For example, when the groundwater flow rate is 4 m/d, a relatively higher migration property may be obtained.

Change of the injection concentration of the remediation reagent has relatively small influence on the CMC-S-nZVI migration. But a lower injection concentration is more beneficial for migration out of the CMC-S-nZVI. When the injection concentration is 150 mg/L, the highest relative outflow concentration ratio of the CMC-S-nZVI is 0.81, which is higher than ratios in 300 mg/L and 600 mg/L under the same condition. Under the condition of guaranteeing that the degradation rate is within the set threshold, an addition concentration of the composition can be limited to be 150 mg/L, so as to obtain relatively higher migration capacity, and the addition concentration of the composition may be a concentration of the CMC-S-nZVI suspension liquid.

The co-existing ions do not have remarkable influence on migration of the CMC-S-nZVI in the aquifer. The highest CMC-S-nZVI relative outflow concentration ratios of a processing group with added co-existing ions and a deionized water processing group are respectively 0.72 and 0.78, which shows that under the influence of the co-existing ions, the CMC-S-nZVI still has a good migration property.

In the factors affecting the material migration property, as the influence of the co-existing ions is small, the concentration of the added composition may be adjusted based on a field condition. The field condition can include the medium particle diameter, the groundwater flow rate, the co-existing ion concentration and/or the organic pollutant concentration. Further, the concentration of the added composition can be usually adjusted in a reducing tendency, so as to improve the material migration property. Reduction of the concentration of the added composition at least guarantees that the degradation rate of the 2,4-DCP thereby is within the set threshold.

Preferably, before injecting the remediation reagent, the soil medium particle diameter and/or the groundwater flow rate in the to-be-remediated region are obtained through the monitoring well, and thus the injection amount and/or the injection mode of the remediation reagent are adjusted based on a threshold range in which the soil medium particle diameter and/or the groundwater flow rate are/is located. When the soil medium particle diameter is in a first particle diameter range and/or the groundwater flow rate is in a first flow rate range, the injection amount and/or an injection frequency of the remediation reagent can be improved at least partially. The first particle diameter range of the medium is 0.5-1.0 mm, and the first flow rate range of the groundwater is 3-4 m/d.

Further, adjustment of the concentration of the added composition is limited by the expected number of recycling times of the CMC-S-nZVI. As with increase of the number of recycling times of the CMC-S-nZVI, the degradation rate is a reducing tendency in whole with a change range being gradually increased, after recycling for many times, the degradation rate gradually approaches the set threshold. In order to control run cost, the CMC-S-nZVI is usually prepared in advance before executing a remediation work, the CMC-S-nZVI is usually arranged with the expected number of recycling times, so as to guarantee that the remediation work can achieve a purpose of the corresponding degradation rate in a low-consumption state.

Preferably, after injecting the CMC-S-nZVI/$H_2O_2$, the stable in-situ reaction zone is formed rapidly around the injection well, so the concentration of the 2,4-DCP around the injection well is reduced rapidly. At the moment, an acidic region is formed, a lower pH value accelerates the CMC-S-nZVI corrosion, then generation of ·OH is facilitated, and thus the total iron concentration and an ORP value at a sampling opening nearby the injection well are also high. With running progress, the in-situ reaction zone gradually migrates downstream along with the water flow, so the concentration of the 2,4-DCP in the downstream region of the injection well is further reduced till the in-situ reaction zone is dissipated completely. Further, the change tendency of the total iron concentration is consistent with the change of the 2,4-DCP concentration, that is, it reflects an evolution process from forming after injecting to dissipation of the in-situ reaction zone built by the CMC-S-nZVI/$H_2O_2$.

It needs to be noted that the above specific embodiments are exemplary. Those skilled in the art can figure out various solutions under inspiration of the disclosed contents of the present disclosure, but these solutions also belong to the disclosure scope of the present disclosure and fall within the protection scope of the present disclosure. Those skilled in the art should understand that the specification and the accompanying drawings of the present disclosure are explanatory but not form a limitation on the claims. The protection scope of the present disclosure should be limited by the claims and their equivalents. The specification of the present disclosure contain various inventive concepts, such as "preferably", "according to one preferred implementation" or "optionally", which all represent that the corresponding paragraphs discloses an independent concept. The applicant reserves the right of proposing a divisional application according to each inventive concept. In the entire text, a feature introduced by "preferably" is merely one optional mode and should not be understood as necessary, so the applicant reserves the right of giving up or deleting the related preferred features whenever possible.

The invention claimed is:

1. A method for remediating groundwater chlorophenols organic contamination, comprising the following steps of:
   step S1. determining a location of a contamination source;
   step S2. setting up an injection well in upstream in a flowing direction of the groundwater of the contamination source; and
   step S3. degrading chlorophenols organic contamination in groundwater in the to-be-remediated region by injecting a remediation reagent into groundwater in a to-be-remediated region through the injection well;
   wherein,
   the step S3 comprises: detecting a flow rate of the groundwater in the to-be-remediated region,
   when the flow rate is greater than 4 m/d, the remediation reagent comprises sulfidated nanoscale zero-valent iron and hydrogen peroxide, wherein an iron-sulfur ratio in the sulfidated nanoscale zero-valent iron is 15; and
   when the flow rate is smaller than or equal to 4 m/d, the remediation reagent comprises sulfidated nanoscale zero-valent iron modified by sodium carboxymethylcellulose and hydrogen peroxide, wherein the sodium carboxymethylcellulose in the sulfidated nanoscale zero-valent iron modified by sodium carboxymethylcellulose is used at a concentration of 1.0 g·$L^{-1}$.

2. The method of claim 1, wherein the sulfidated nanoscale zero-valent iron is prepared by the following steps:
   adding absolute ethyl alcohol into a prepared $FeSO_4$ solution for stirring, dropwise adding a NaOH solution with dissolved $NaBH_4$, and then reacting to obtain nanoscale zero-valent iron; and
   adding the obtained nanoscale zero-valent iron into a prepared $Na_2S$ solution, obtaining a sulfidated nanoscale zero-valent iron suspension liquid through ultrasonic, and thereby preparing the sulfidated nanoscale zero-valent iron.

3. The method of claim 1, wherein the sulfidated nanoscale zero-valent iron modified by sodium carboxymethylcellulose is prepared by the following steps:
   adding the sulfidated nanoscale zero-valent iron into a debubbled sodium carboxymethylcellulose solution, performing ultrasonic dispersion, then freezing and shaking well to obtain a sulfidated nanoscale zero-valent iron suspension liquid modified by sodium carboxymethylcellulose, and thereby obtaining the sulfidated nanoscale zero-valent iron modified by sodium carboxymethylcellulose after magnetic separation.

4. The method of claim 1, wherein when the flow rate is greater than 4 m/d, an amount of the added sulfidated nanoscale zero-valent iron is 0.5 g per liter of groundwater, a concentration of $H_2O_2$ is 3 mM, and pH is 4.

5. The method of claim 1, wherein when the flow rate is smaller than or equal to 4 m/d, an amount of the added sulfidated nanoscale zero-valent iron modified by sodium carboxymethylcellulose is 0.6 g per liter of groundwater, a concentration of $H_2O_2$ is 5 mM, and pH is 4.

6. The method of claim 1, wherein before injecting the remediation reagent, a concentration of $SO_4^{2-}$ in the groundwater in the to-be-remediated is adjusted to a range of 1 mM to 100 mM, and a concentration of is adjusted to a range of 1 mM to 10 mM.

7. The method of claim 1, wherein, a plurality of monitoring wells are arranged in a to-be-remediated region, when the remediation reagent is injected at interval time, a next injection node of the remediation reagent is determined through change conditions of one or more monitored parameters of a pollutant concentration, a total iron concentration distribution and a pH value in the groundwater monitored in real time by each monitoring well, wherein the injection node is at least at a moment when any one or more monitored parameters have an inflection point in a range curve in data obtained from all the monitoring wells.

8. The method of claim 7, wherein at least one processing unit capable of receiving real-time monitored data of each monitoring well is configured to analyze the injection node of the remediation reagent, wherein, a monitoring frequency that the processing unit obtains the real-time monitored data of each monitoring well is adjusted at least in a periodic fluctuation mode based on the injection node of the remediation reagent, and a peak value of the monitoring frequency can be set higher than a peak value of a previous fluctuation period.

9. The method of claim 7, wherein S-nZVI or CMC-S-nZVI in the remediation reagent can be recycled repeatedly under a condition of controlling a degradation rate of a pollutant to be at least greater than 70%.

10. The method of claim 2, wherein before injecting the remediation reagent, a concentration of $SO_4^{2-}$ in the groundwater in the to-be-remediated is adjusted to a range of 1 mM to 100 mM, and a concentration of $Cl^-$ is adjusted to a range of 1 mM to 10 mM.

11. The method of claim 3, wherein before injecting the remediation reagent, a concentration of $SO_4^{2-}$ in the groundwater in the to-be-remediated is adjusted to a range of 1 mM to 100 mM, and a concentration of $Cl^{-1}$ is adjusted to a range of 1 mM to 10 mM.

12. The method of claim 4, wherein before injecting the remediation reagent, a concentration of $SO_4^{2-}$ in the groundwater in the to-be-remediated is adjusted to a range of 1 mM to 100 mM, and a concentration of $Cl^-$ is adjusted to a range of 1 mM to 10 mM.

13. The method of claim 5, wherein before injecting the remediation reagent, a concentration of $SO_4^{2-}$ in the groundwater in the to-be-remediated is adjusted to a range of 1 mM to 100 mM, and a concentration of $Cl^-$ is adjusted to a range of 1 mM to 10 mM.

14. The method of claim 2, wherein before injecting the remediation reagent, a concentration of $HCO_3^-$ in the groundwater is less than 10 mM, and a concentration of $NO_3^-$ is less than 10 mM.

15. The method of claim 3, wherein before injecting the remediation reagent, a concentration of $HCO_3^-$ in the groundwater is less than 10 mM, and a concentration of $NO_3^-$ is less than 10 mM.

16. The method of claim 4, wherein before injecting the remediation reagent, a concentration of $HCO_3^-$ in the groundwater is less than 10 mM, and a concentration of $NO_3^-$ is less than 10 mM.

17. The method of claim 5, wherein before injecting the remediation reagent, a concentration of $HCO_3^-$ in the groundwater is less than 10 mM, and a concentration of $NO_3^-$ is less than 10 mM.

\* \* \* \* \*